US012308162B2

(12) United States Patent
Ishida et al.

(10) Patent No.: US 12,308,162 B2
(45) Date of Patent: May 20, 2025

(54) METAL MAGNETIC PARTICLE, INDUCTOR, METHOD FOR MANUFACTURING METAL MAGNETIC PARTICLE, AND METHOD FOR MANUFACTURING METAL MAGNETIC CORE

(71) Applicant: Murata Manufacturing Co., Ltd., Kyoto-fu (JP)

(72) Inventors: Takuya Ishida, Nagaokakyo (JP); Makoto Yamamoto, Nagaokakyo (JP); Katsutoshi Uji, Nagaokakyo (JP); Yuya Ishida, Nagaokakyo (JP); Mitsuru Odahara, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 18 days.

(21) Appl. No.: 18/345,907

(22) Filed: Jun. 30, 2023

(65) Prior Publication Data

US 2023/0343512 A1 Oct. 26, 2023

Related U.S. Application Data

(62) Division of application No. 17/213,121, filed on Mar. 25, 2021, now Pat. No. 11,742,141.

(30) Foreign Application Priority Data

Mar. 27, 2020 (JP) ................................ 2020-058367

(51) Int. Cl.

*H01F 41/02* (2006.01)
*B22F 1/142* (2022.01)

(Continued)

(52) U.S. Cl.

CPC .......... *H01F 41/0246* (2013.01); *B22F 1/142* (2022.01); *B22F 1/16* (2022.01);

(Continued)

(58) Field of Classification Search

CPC ......... H01F 41/0236; B22F 1/16; B22F 1/142
See application file for complete search history.

(56) References Cited

U.S. PATENT DOCUMENTS

2005/0181202 A1* 8/2005 Kaneko .................. B82Y 25/00 428/407
2012/0082844 A1* 4/2012 Takahashi ................. H01F 1/33 428/336

(Continued)

FOREIGN PATENT DOCUMENTS

CN 109119222 A 1/2019
CN 110246651 A 9/2019

(Continued)

*Primary Examiner* — Dah-Wei D. Yuan
*Assistant Examiner* — Kristen A Dagenais
(74) *Attorney, Agent, or Firm* — Studebaker Brackett PLLC

(57) ABSTRACT

A metal magnetic particle provided with an oxide layer on a surface of an alloy particle containing Fe and Si. The oxide layer has a first oxide layer, a second oxide layer, and a third oxide layer from a side of the alloy particle. All of the first oxide layer, the second oxide layer, and the third oxide layer contain Si. Also, in line analysis of element content by using a scanning transmission electron microscope-energy dispersive X-ray spectroscopy, the first oxide layer is a layer having Fe content smaller than Si content in the alloy particle, the second oxide layer is a layer having Fe content larger than the Si content in the alloy particle, and the third oxide layer is a layer having Fe content smaller than the Si content in the alloy particle.

2 Claims, 2 Drawing Sheets

(51) Int. Cl.
*B22F 1/16* (2022.01)
*H01F 1/147* (2006.01)
*H01F 1/33* (2006.01)
*B22F 1/145* (2022.01)

(52) U.S. Cl.
CPC ........... *H01F 1/14766* (2013.01); *H01F 1/33* (2013.01); *B22F 1/145* (2022.01); *B22F 2301/35* (2013.01); *B22F 2302/25* (2013.01); *Y10T 428/12181* (2015.01)

(56) References Cited

U.S. PATENT DOCUMENTS

| | | | | |
|---|---|---|---|---|
| 2015/0155084 A1* | 6/2015 | Kim | H01F 17/0013 | 336/200 |
| 2019/0279801 A1* | 9/2019 | Yoshidome | H01F 1/26 | |

FOREIGN PATENT DOCUMENTS

| | | | |
|---|---|---|---|
| JP | 2011249774 | A | 12/2011 |
| JP | 4866971 | B2 | 2/2012 |
| JP | 5082002 | B1 | 11/2012 |
| JP | 2014143286 | A | 8/2014 |
| JP | 2018011043 | A | 1/2018 |
| JP | 2018037635 | A | 3/2018 |
| JP | 2019009307 | A | 1/2019 |
| JP | 2019-160943 | A | 9/2019 |
| WO | 2016056351 | A1 | 4/2016 |

* cited by examiner

METAL MAGNETIC PARTICLE, INDUCTOR, METHOD FOR MANUFACTURING METAL MAGNETIC PARTICLE, AND METHOD FOR MANUFACTURING METAL MAGNETIC CORE

CROSS-REFERENCE TO RELATED APPLICATION

This application is a Divisional of U.S. patent application Ser. No. 17/213,121, filed Mar. 25, 2021, which claims benefit of priority to Japanese Patent Application No. 2020-058367, filed Mar. 27, 2020, the entire content of which is incorporated herein by reference.

BACKGROUND

Technical Field

The present disclosure relates to a metal magnetic particle, an inductor, a method for manufacturing a metal magnetic particle, and a method for manufacturing a metal magnetic core.

Background Art

A power inductor to be used in a power supply circuit is required to have a small size, and a low loss, and to deal with a large current, and in order to respond these requirements, it has been studied to use metal magnetic particles having a high saturation magnetic flux density in a magnetic material. The metal magnetic particles have an advantage of having a high saturation magnetic flux density, but since insulation resistance of the material alone is low, it is necessary to ensure insulation between the metal magnetic particles in order to use the metal magnetic particles as a magnetic material of an electronic component. For this reason, various methods for improving insulation properties of the metal magnetic particles have been studied.

For example, Japanese Patent No. 5082002 discloses a method of coating a surface of a metal magnetic particle with an insulating film such as glass. Further, Japanese Patent No. 4866971 discloses a method of forming an oxide layer derived from a material on a surface of a metal magnetic particle.

However, the method described in Japanese Patent No. 5082002 has a problem in that it is difficult to uniformly form an insulating film such as glass on a surface of a metal magnetic particle, and a portion having a thin film thickness serves as a start point of dielectric breakdown.

In addition, the method described in Japanese Patent No. 4866971 has a problem in that insulation reliability is not sufficient because the oxide layer derived from the raw material potentially contains defects. In addition, the metal magnetic material described in Japanese Patent No. 4866971 has a problem in that heat treatment cannot be performed at a high temperature in order to prevent progress of oxidation of the raw material particles.

SUMMARY

Accordingly, the present disclosure is to provide a metal magnetic particle and an inductor that have excellent insulation properties and direct-current superposition characteristics. The method also provides a method for manufacturing a metal magnetic particle capable of obtaining a metal magnetic particle having excellent insulation properties and direct-current superposition characteristics, and a method for manufacturing a metal magnetic core capable of obtaining a metal magnetic core having excellent insulation properties and direct-current superposition characteristics.

A metal magnetic particle according to preferred embodiments of the present disclosure is a metal magnetic particle provided with an oxide layer on a surface of an alloy particle containing Fe and Si, the oxide layer includes a first oxide layer, a second oxide layer, and a third oxide layer from a side of the alloy particle. All of the first oxide layer, the second oxide layer, and the third oxide layer include Si. Also, in line analysis of element content by using a scanning transmission electron microscope-energy dispersive X-ray spectroscopy, the first oxide layer is a layer having Fe content smaller than Si content in the alloy particle, the second oxide layer is a layer having Fe content larger than the Si content in the alloy particle, and the third oxide layer is a layer having Fe content smaller than the Si content in the alloy particle.

An inductor according to preferred embodiments of the present disclosure includes the metal magnetic particles according to preferred embodiments of the present disclosure.

A method for manufacturing a metal magnetic particle according to preferred embodiments of the present disclosure includes mixing a raw material particle having, on a surface of an alloy particle containing Fe and Si, an Si oxide film and an Fe oxide film from a side of the alloy particle with Si alkoxide and alcohol, forming a coating film forming particle formed with a coating film containing silicon oxide by hydrolyzing and drying the Si alkoxide, and forming an oxide layer on the surface of the alloy particle by performing heat treatment on the coating film forming particle in an oxidizing atmosphere. An average thickness of the coating film is larger than 14 nm and equal to or smaller than 30 nm (i.e., from larger than 14 nm to 30 nm), and a temperature of the heat treatment is equal to or higher than 600° C. and lower than 750° C. (i.e., from 600° C. to lower than 750° C.).

A method for manufacturing a metal magnetic core according to preferred embodiments of the present disclosure includes mixing raw material particles each of which has, on a surface of an alloy particle containing Fe and Si, an Si oxide film and an Fe oxide film with Si alkoxide and alcohol, forming coating film forming particles each of which is formed with a coating film containing silicon oxide by hydrolyzing and drying the Si alkoxide, molding the coating film forming particles, and forming an oxide layer on the surface of each of the alloy particles by performing heat treatment on a molded body of the coating film forming particles in an oxidizing atmosphere. An average thickness of the coating film is larger than 14 nm and smaller than or equal to 30 nm (i.e., from larger than 14 nm to 30 nm), and a temperature of the heat treatment is equal to or higher than 600° C. and lower than 750° C. (i.e., from 600° C. to lower than 750° C.).

Other features, elements, characteristics and advantages of the present disclosure will become more apparent from the following detailed description of preferred embodiments of the present disclosure with reference to the attached drawings.

DETAILED DESCRIPTION

Hereinafter, a metal magnetic particle, an inductor, a method for manufacturing a metal magnetic particle, and a method for manufacturing a metal magnetic core according to the present disclosure will be described.

However, the present disclosure is not limited to the following configurations, and can be appropriately changed and applied without departing from the spirit and scope of the present disclosure. Note that a combination of two or more preferred configurations of the present disclosure to be described below is also an example of the present disclosure.

Metal Magnetic Particle

A metal magnetic particle according to preferred embodiments of the present disclosure is a metal magnetic particle provided with an oxide layer on a surface of an alloy particle containing Fe and Si, the oxide layer includes a first oxide layer, a second oxide layer, and a third oxide layer from a side of the alloy particle. All of the first oxide layer, the second oxide layer, and the third oxide layer include Si. Also, in line analysis of element content by using a scanning transmission electron microscope-energy dispersive X-ray spectroscopy, the first oxide layer is a layer having Fe content smaller than Si content in the alloy particle, the second oxide layer is a layer having Fe content larger than the Si content in the alloy particle, and the third oxide layer is a layer having Fe content smaller than the Si content in the alloy particle.

Figure 1:
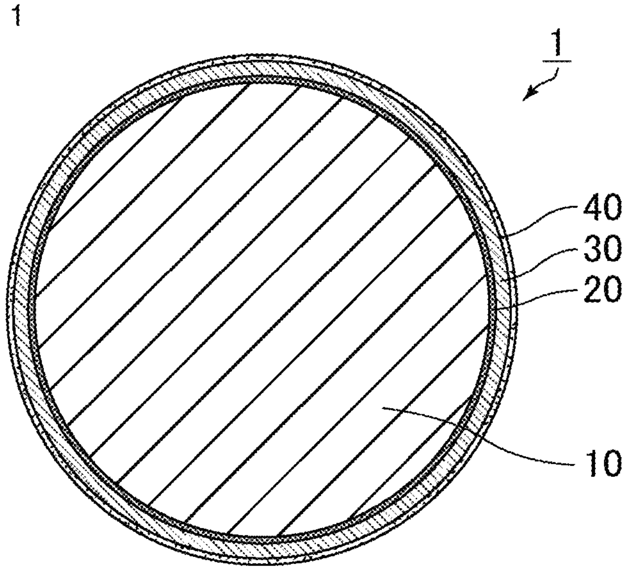
FIG. 1 is a cross-sectional view schematically illustrating an example of a metal magnetic particle according to the present disclosure.

FIG. 1 is a cross-sectional view schematically illustrating an example of a metal magnetic particle according to the present disclosure.

As illustrated in FIG. 1, a metal magnetic particle 1 is provided with an oxide layer on a surface of an alloy particle 10 containing Fe and Si.

The oxide layer is a first oxide layer 20, a second oxide layer 30, and a third oxide layer 40 from the alloy particle 10 side.

The alloy particle contains Fe and Si.

A weight percentage of the Si in the alloy particle is preferably equal to or larger than about 1.5 parts by weight and equal to or smaller than about 8.0 parts by weight (i.e., from about 1.5 parts by weight to about 8.0 parts by weight) with respect to 100 parts by weight of a total weight of the Fe and the Si.

When the weight percentage of the Si in the alloy particle is smaller than about 1.5 parts by weight, the loss reduction effect is poor. On the other hand, when the weight percentage of the Si in the alloy particle is larger than about 8.0 parts by weight, saturation magnetization is largely decreased, and direct-current superposition characteristics are reduced.

The alloy particle may contain Cr in addition to the Fe and the Si.

The alloy particle preferably contains smaller than about 1.0 part by weight of Cr with respect to 100 parts by weight of the total weight of the Fe and the Si, more preferably contains equal to or smaller than about 0.9 parts by weight of Cr, and still more preferably does not contain Cr. When the Cr content is small, a saturation magnetic flux density is improved, and thus the direct-current superposition characteristics are improved.

The alloy particle may contain the same element as impurity contained in pure iron as an impurity component.

Examples of the impurity component include C, Mn, P, S, Cu, Al, and the like.

The oxide layer has the first oxide layer, the second oxide layer, and the third oxide layer from the alloy particle side.

The oxide layer herein means a layer in which both oxygen and metal elements (including silicon (Si) in the metal elements herein) are counted in line analysis of element content to be described below. When both oxygen and silicon are counted, it is considered that oxide containing silicon is present, and when both oxygen and iron (Fe) are counted, it is considered that oxide containing iron is present.

The first oxide layer is a layer in which Fe content is smaller than Si content in the alloy particle in line analysis of element content (hereinafter also simply referred to as line analysis) using the scanning transmission electron microscope (STEM)-energy dispersive X-ray spectroscopy (EDX). The second oxide layer is a layer in which Fe content is larger than the Si content in the alloy particle in the line analysis. The third oxide layer is a layer in which Fe content is smaller than the Si content in the alloy particle in the line analysis.

Boundaries among the first oxide layer, the second oxide layer, and the third oxide layer are defined as follows.

In the line analysis of element content using the STEM-EDX, the Si content in the alloy particle is set as a baseline.

The Si content in the alloy particle as the baseline is determined, in data on which the line analysis is performed from the surface of the alloy particle in a center direction, by counting element content from a point at which an oxygen count is detected as 0 for the first time at predetermined intervals and checking the data in a section that is equal to or longer than a section reaching a point where the oxygen count is detected as 0 for the fifth time, and that is equal to or longer than a section from the point at which the oxygen count is detected as 0 for the first time to about 3.5 nm.

When the interval for counting the element content is too short, the section from the point at which the oxygen count is detected as 0 for the first time to the point at which the oxygen count is detected as 0 for the fifth time may not be equal to or longer than about 3.5 nm in some cases, so the measurement is performed by further increasing the number of measurement points in the center direction from the point at which the oxygen count is detected as 0 for the fifth time such that the measurement section becomes equal to or longer than about 3.5 nm.

On the other hand, even when the section reaches about 3.5 nm from the point where the oxygen count is detected as 0 for the first time, the number of times that the oxygen count becomes 0 may not reach 5 times in some cases, so that the measurement is performed until the number of times that the oxygen count becomes 0 reaches 5 times by further increasing the number of measurement points in the center direction until the number of times that the oxygen count becomes 0 reaches 5 times, even after the measurement section reaches about 3.5 nm.

The interval for which the element content is counted may be, for example, about 0.9 nm.

Additionally, in the data in this section, an Si count number (Si content) when the Si count number is the minimum value is defined as the baseline.

In the alloy particle, the Fe content is larger than the Si content.

In the line analysis of element content using the STEM-EDX, the first oxide layer is from a point where the Fe content becomes smaller than the Si content (the baseline) in the alloy particle (a first boundary) to a point where the Fe content becomes larger than the Si content (the base line) in the alloy particle (a second boundary).

The second oxide layer is from the second boundary to a point where the Fe content becomes smaller than the Si content (the baseline) in the alloy particle (a third boundary), in the line analysis of element content using the STEM-EDX.

The third oxide layer is from the third boundary in the line analysis of element content using the STEM-EDX to a point where the Si content becomes smaller than the Si content (the baseline) in the alloy particle (a fourth boundary).

The "content" of each element in the line analysis of element content using the STEM-EDX is a count number (also referred to as a net count) of X-rays unique to each element, and does not indicate a weight ratio or an atomic ratio.

Further, the magnification in the STEM-EDX is 400000 times.

The first oxide layer is a layer in which the Si content is relatively large and the Fe content is relatively small. The first oxide layer contains a large amount of Si derived from an Si oxide film provided on the surface of the alloy particle.

The second oxide layer is an FeSi oxide film in which Fe and Si coexist. The second oxide layer is a layer where Fe derived from an Fe oxide film provided on the surface of the alloy particle has diffused in a coating film containing silicon oxide.

The third oxide layer is a layer of a coating film containing silicon oxide, and is a layer where the Si content is relatively large and the Fe content is relatively small in a portion where Fe in the Fe oxide film has not diffused to an outer side portion.

A thickness of the first oxide layer is preferably larger than or equal to about 4 nm and smaller than or equal to about 10 nm (i.e., from about 4 nm to about 10 nm), and more preferably larger than or equal to about 5 nm and smaller than or equal to about 8 nm (i.e., from about 5 nm to about 8 nm).

In the line analysis of the element content using the STEM-EDX, a ratio of the Fe content to the Si content (Fe content/Si content) at the point where the Si content of the first oxide layer takes the local maximum value is preferably equal to or larger than about 0.05 and equal to or smaller than about 0.20 (i.e., from about 0.05 to about 0.20), and more preferably equal to or larger than about 0.08 and equal to or smaller than about 0.13 (i.e., from about 0.08 to about 0.13).

A thickness of the second oxide layer is preferably larger than or equal to about 15 nm and smaller than or equal to about 50 nm (i.e., from about 15 nm to about 50 nm), and more preferably larger than or equal to about 16 nm and smaller than or equal to about 42 nm (i.e., from about 16 nm to about 42 nm).

In the line analysis of element content using the STEM-EDX, a ratio of the Fe content to the Si content (Fe content/Si content) at the point where the Fe content of the second oxide layer takes the local maximum value is preferably equal to or larger than about 2.0 and equal to or smaller than about 5.0 (i.e., from about 2.0 to about 5.0), and more preferably equal to or larger than about 3.5 and equal to or smaller than about 4.5 (i.e., from about 3.5 to about 4.5).

A thickness of the third oxide layer is preferably larger than or equal to about 5 nm and smaller than or equal to about 20 nm (i.e., from about 5 nm to about 20 nm), and more preferably larger than or equal to about 7 nm and smaller than or equal to about 12 nm (i.e., from about 7 nm to about 12 nm).

In the line analysis of element content using the STEM-EDX, a ratio of the Fe content to the Si content (Fe content/Si content) at the point where the Si content of the third oxide layer takes the local maximum value is preferably equal to or larger than about 0.1 and equal to or smaller than about 0.5 (i.e., from about 0.1 to about 0.5), and more preferably equal to or larger than about 0.2 and equal to or smaller than about 0.4 (i.e., from about 0.2 to about 0.4).

Note that the thicknesses of the first oxide layer, the second oxide layer, and the third oxide layer are determined by performing the line analysis of each of three positions at which a length of an outer periphery of a cross section of the metal magnetic particle is equally divided by three in an enlarged image obtained by observing the cross-section of the metal magnetic particle by the STEM-EDX, determining the thicknesses of the respective layers, and then determining averages of the thicknesses at the three positions. Further, a ratio of the Fe content to the Si content in each layer (Fe content/Si content) is also determined as an average value of the measured values obtained by the line analysis at the three positions in a similar manner.

In the metal magnetic particle according to the present disclosure, it is preferable that the adjacent oxide layers have different crystallinity.

For example, when the first oxide layer is amorphous, the second oxide layer is preferably crystalline, and the third oxide layer is preferably amorphous.

By joining the amorphous oxide layer and the crystalline oxide layer, the electrical resistance at the joining interface is increased. Therefore, when the crystallinity of the adjacent oxide layers is different, the insulation resistance can be increased.

The crystallinity of each oxide layer can be confirmed by whether or not a periodic light and dark pattern appears in an FFT image obtained by performing Fourier-transformation on an STEM image. When the oxide layer is crystalline, the periodic light and dark pattern appears in the FFT image, and when the oxide layer is amorphous, the periodic light and dark pattern does not appear in the FFT image.

Inductor

An inductor according to preferred embodiments of the present disclosure includes the metal magnetic particles according to preferred embodiments of the present disclosure.

The inductor according to the present disclosure includes the metal magnetic particles according to the present disclosure, and thus has a high withstand voltage and excellent direct-current superposition characteristics.

The inductor according to the present disclosure includes, for example, the metal magnetic particles according to the present disclosure and a winding disposed around the metal magnetic particles.

The material, the wire diameter, the number of turns, and the like of the winding are not particularly limited, and may be selected according to the desired characteristics.

The metal magnetic particles configuring the inductor according to the present disclosure may be molded into a predetermined shape. The metal magnetic particles molded into the predetermined shape are also referred to as a metal magnetic core. Therefore, an inductor including a metal magnetic core made of the metal magnetic particles according to the present disclosure and a winding disposed around the metal magnetic core is also the inductor according to the present disclosure.

Method for Manufacturing Metal Magnetic Particles

A method for manufacturing a metal magnetic particle according to preferred embodiments of the present disclosure includes mixing a raw material particle having, on a surface of an alloy particle containing Fe and Si, an Si oxide film and an Fe oxide film from a side of the alloy particle with Si alkoxide and alcohol, forming a coating film forming particle formed with a coating film containing silicon oxide by hydrolyzing and drying the Si alkoxide, and forming an oxide layer on the surface of the alloy particle by performing heat treatment on the coating film forming particle in an oxidizing atmosphere. An average thickness of the coating film is larger than 14 nm and equal to or smaller than 30 nm (i.e., from larger than 14 nm to 30 nm), and a temperature of the heat treatment is equal to or higher than 600° C. and lower than 750° C. (i.e., from 600° C. to lower than 750° C.).

In the method for manufacturing the metal magnetic particle according to the present disclosure, the coating film containing the silicon oxide is formed on the surface of the raw material particle having the Si oxide film and the Fe oxide film on the surface of the alloy particle, and the coating film is subjected to the heat treatment in the oxidizing atmosphere. As a result, the Si oxide film serves as the first oxide layer, Fe derived from the Fe oxide film diffuses into the coating film containing the silicon oxide to serve as the second oxide layer. In addition, in the coating film containing the silicon oxide, a portion where Fe in the Fe oxide film has not diffused to an outer side portion serves as the third oxide layer.

From this, the metal magnetic particle according to the present disclosure can be obtained by using the method for manufacturing the metal magnetic particle according to the present disclosure.

When the average thickness of the coating film is larger than about 14 nm, Fe derived from the Fe oxide film diffuses into the coating film containing the silicon oxide, and diffusion to an outer side portion of the coating film can be easily suppressed, thereby making it easier to form the third oxide layer.

When the average thickness of the coating film is smaller than or equal to about 30 nm, the volume of the oxide layer can be relatively small, thereby making it easier to obtain the metal magnetic particle having high magnetic permeability while ensuring insulation properties.

Mixing Raw Material Particle with Si Alkoxide and Alcohol

First, a raw material particle having, on a surface of an alloy particle containing Fe and Si, an Si oxide film and an Fe oxide film from the alloy particle side is prepared.

A method for forming the Si oxide film and the Fe oxide film on the surface of the alloy particle is not particularly limited, but a method for gradually oxidizing a fine particle of an FeSi alloy obtained by a water atomization method or the like is exemplified.

The gradual oxidation is a process in which the surface of the alloy particle is intentionally oxidized for the purpose of suppressing excessive oxidation of the alloy particle, and a surface oxide film functioning as a protective film for oxidation is formed.

For example, for a dried FeSi alloy particle placed in a non-oxidizing atmosphere, an oxygen concentration in the atmosphere is gradually increased to gradually oxidize a surface of the FeSi alloy particle, and the Si oxide film and the Fe oxide film are formed on the surface of the alloy particle.

The alloy particle to be used in the method for manufacturing the metal magnetic particle according to the present disclosure include the Si and the Fe.

An average particle diameter of the raw material particles is not particularly limited, but D50=a diameter equal to or larger than about 1 μm and equal to or smaller than about 10 μm (i.e., from about 1 μm to about 10 μm) is preferably satisfied.

Note that D50 is a particle diameter at which a cumulative volume of the alloy particle measured by a laser diffraction method is about 50%.

Subsequently, the raw material particle is mixed with Si alkoxide and alcohol.

The Si alkoxide is preferably tetraethoxysilane.

When the Si alkoxide is tetraethoxysilane, it is easy to form a coating film having a uniform thickness on the surface of the raw material particle.

In addition, the alcohol is preferably ethanol.

When the raw material particle is mixed with the Si alkoxide and the alcohol, it is preferable to add polyvinylpyrrolidone as a water-soluble polymer. In addition, it is preferable to add an aqueous ammonia solution as a basic catalyst. The Si alkoxide is likely to undergo hydrolysis in presence of a basic catalyst and water.

Forming Coating Film Forming Particle

Subsequently, the Si alkoxide is hydrolyzed and dried, thereby producing a coating film forming particle in which a coating film containing silicon oxide is formed.

At this time, a thickness of the coating film provided on the surface of the raw material particle is set to be larger than about 14 nm and equal to or smaller than about 30 nm (i.e., from larger than about 14 nm to about 30 nm).

Performing Heat Treatment on Coating Film Forming Particle

Subsequently, the coating film forming particle is subjected to heat treatment in an oxidizing atmosphere, thereby forming an oxide layer on the surface of the alloy particle.

A temperature of the heat treatment is set to be higher than or equal to about 600° C. and lower than about 750° C. (i.e., from about 600° C. to lower than about 750° C.).

When the temperature of the heat treatment is lower than about 600° C., Fe in the Fe oxide film may not diffuse into the coating film. On the other hand, when the temperature of the heat treatment is equal to or higher than about 750° C., the oxidation reaction of the alloy particle proceeds, and magnetic characteristics may deteriorate in some cases.

Method for Manufacturing Metal Magnetic Core

A method for manufacturing a metal magnetic core according to preferred embodiments of the present disclosure includes mixing raw material particles each of which has, on a surface of an alloy particle containing Fe and Si, an Si oxide film and an Fe oxide film with Si alkoxide and alcohol, forming coating film forming particles each of which is formed with a coating film containing silicon oxide by hydrolyzing and drying the Si alkoxide, molding the coating film forming particles, and forming an oxide layer on the surface of each of the alloy particles by performing heat treatment on a molded body of the coating film forming particles in an oxidizing atmosphere. An average thickness of the coating film is larger than 14 nm and smaller than or equal to 30 nm (i.e., from larger than 14 nm to 30 nm), and a temperature of the heat treatment is equal to or higher than 600° C. and lower than 750° C. (i.e., from 600° C. to lower than 750° C.).

In the method for manufacturing the metal magnetic core according to the present disclosure, by performing the heat treatment in the oxidizing atmosphere on the molded body obtained by molding the coating film forming particles obtained by forming the coating film containing the silicon oxide on the surface of each of the raw material particles having the Si oxide film and the Fe oxide film from the side of the alloy particle, similarly to the method for manufacturing the metal magnetic particle according to the present disclosure, Fe derived from the Fe oxide film can be diffused to an inner side portion of the coating film to form the second oxide layer. In addition, it is possible to obtain the metal magnetic core in which the alloy particles are joined to each other by the oxide layer.

Among the respective processes configuring the method for manufacturing the metal magnetic core according to the present disclosure, the processes other than the molding are common to those of the method for manufacturing the metal magnetic particle according to the present disclosure.

In the molding, it is preferable to mix a solvent containing binder resin and the coating film forming particles, then to remove the solvent to prepare granulated powder, and to mold the granulated powder.

As the binder resin, epoxy resin, silicone resin, phenol resin, polyamide resin, polyimide resin, polyphenylene sulfide resin, ethyl cellulose, and the like are preferable.

Examples of the solvent include a polyvinyl alcohol aqueous solution, terpineol, and the like.

The molded body produced in the molding preferably has a shape corresponding to the shape of the metal magnetic core to be obtained.

Examples of the shape of the metal magnetic core include a substantially rod-like shape, a substantially cylindrical shape, a substantially ring shape, a substantially rectangular parallelepiped shape, and the like.

A molding pressure in the molding is not particularly limited, but it is preferably equal to or larger than about 100 MPa and equal to or smaller than about 500 MPa (i.e., from about 100 MPa to about 500 MPa).

In the method for manufacturing the metal magnetic core according to the present disclosure, the molding preferably includes laminating and pressing a green sheet containing the coating film forming particles.

When the molding includes laminating and pressing the green sheet including the coating film forming particles, a distance between the alloy particles becomes close to each other in the molded body before the heat treatment, and thus it is easy to obtain a metal magnetic core in which the alloy particles are joined to each other by at least one oxide layer of each of the alloy particles, preferably the third oxide layers.

The green sheet containing the coating film forming particles can be obtained by, for example, mixing a solvent containing resin and coating film forming particles to produce slurry, molding the slurry into a thin film by a doctor blade method or the like, and then removing the solvent.

The green sheet containing the coating film forming particles may be formed with a coil pattern or a part thereof by a conductive paste or the like.

The molding may include printing with and drying paste containing the coating film forming particles.

EXAMPLES

Hereinafter, examples in which the metal magnetic particle, the method for manufacturing the metal magnetic particle, the metal magnetic core, and the inductor according to the present disclosure are more specifically disclosed will be described. It should be noted that the present disclosure is not limited to only these examples.

Example 1

Fe:Si=93.5:6.5 (a weight ratio) of FeSi alloy particle was obtained by the water atomization method.

A surface of the obtained FeSi alloy was observed with an STEM, and it was confirmed that two oxide layers each of which has a thickness of about 10 nm were formed on a surface of the FeSi alloy particle.

By using XPS analysis, element analysis was performed in a depth direction from the surface of the FeSi alloy particle, and it was confirmed that there was a layer containing Fe on the surface side of the FeSi alloy particle, and in an inner side portion of the layer, there was a layer containing Si.

From the above-description, it was confirmed that a silicon oxide film having a thickness of about 10 nm and an iron oxide film having a thickness of about 10 nm were formed on the surface of the FeSi alloy particle.

The obtained FeSi alloy particles were used as the raw material particle.

Polyvinylpyrrolidone K30 was added to ethanol added with an aqueous ammonia solution and the FeSi alloy particles, and stirred to obtain a mixed solution. Tetraethoxysilane was added dropwise to the obtained mixed solution, and the mixed solution after the dropwise addition was stirred for 60 minutes to obtain slurry. The slurry was filtered, washed with acetone, and then dried at 60° C. to obtain coating film forming particles.

The coating film forming particles were embedded in resin, then a cross section thereof was polished and processed to obtain a thin piece with a focused ion beam (FIB) apparatus [SMI3050SE manufactured by Seiko Instruments Inc.], and thus a sample for STEM observation was produced. The sample for STEM observation was observed at a magnification of about 400000 times with an STEM (HD-2300A manufactured by Hitachi High-Technologies Corporation), and it was confirmed that the thickness of the coating film was about 19 nm.

100 parts by weight of the obtained coating film forming particles were mixed with 6 parts by weight of epoxy resin and a polyvinyl alcohol aqueous solution to be dried, and then sieved to obtain granulated powder. The granulated powder was filled in a mold having a donut shape and having an outer diameter of 20 mm and an inner diameter of 10 mm, the mold was pressurized at 60° C. for 10 seconds in a pressure of 500 MPa, and the coating film forming particles were molded into a ring shape having an outer diameter of about 20 mm, an inner diameter of about 10 mm, and a thickness of about 2 mm.

The obtained ring was fired in a firing furnace, and a molded body (metal magnetic core) of metal magnetic particles as a fired body was obtained. A peak firing temperature was 690° C., and a holding period of time of the peak temperature was 20 minutes. Additionally, the firing atmosphere was the same as the atmospheric air. Three rings were produced, one ring was used for measurement by the STEM-EDX, one ring was used for measurement of the withstand voltage performance, and one ring was used for measurement of the relative permeability and the direct-current superposition characteristics.

Line Analysis by STEM-EDX

After the obtained ring was embedded in resin, the cross section thereof was polished and processed by an FIB to obtain a thin piece, and thus, a sample for STEM observation was prepared. By using the STEM and EDX (GENESIS XM4 manufactured by EDAX Inc.), line analysis of the sample for STEM measurement is performed. A start point was the inside of an alloy particle, and element analysis was performed toward an outer side portion (the oxide layer). The magnification of the STEM was 400000 times.

Figure 2:
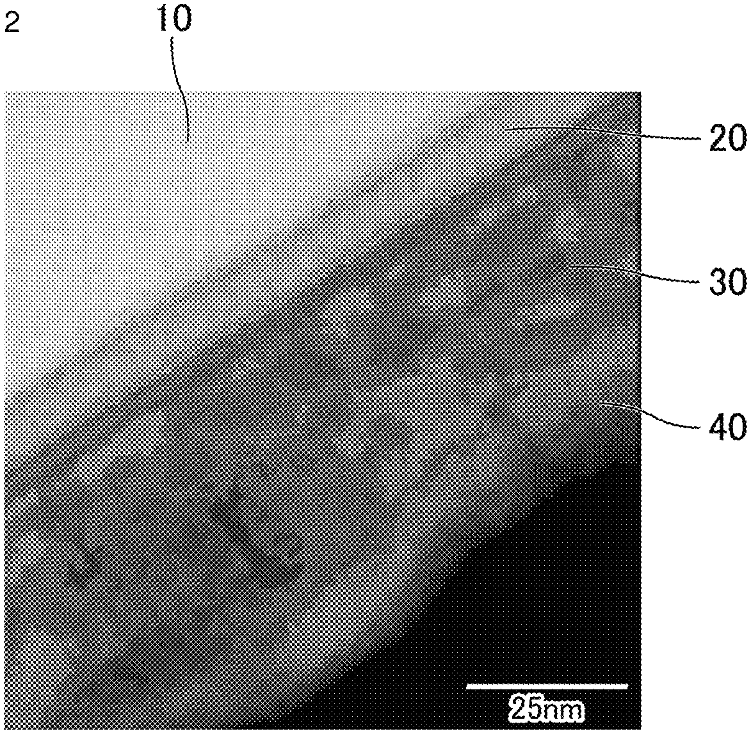
FIG. 2 is an STEM image of Example 1.
Figure 3:
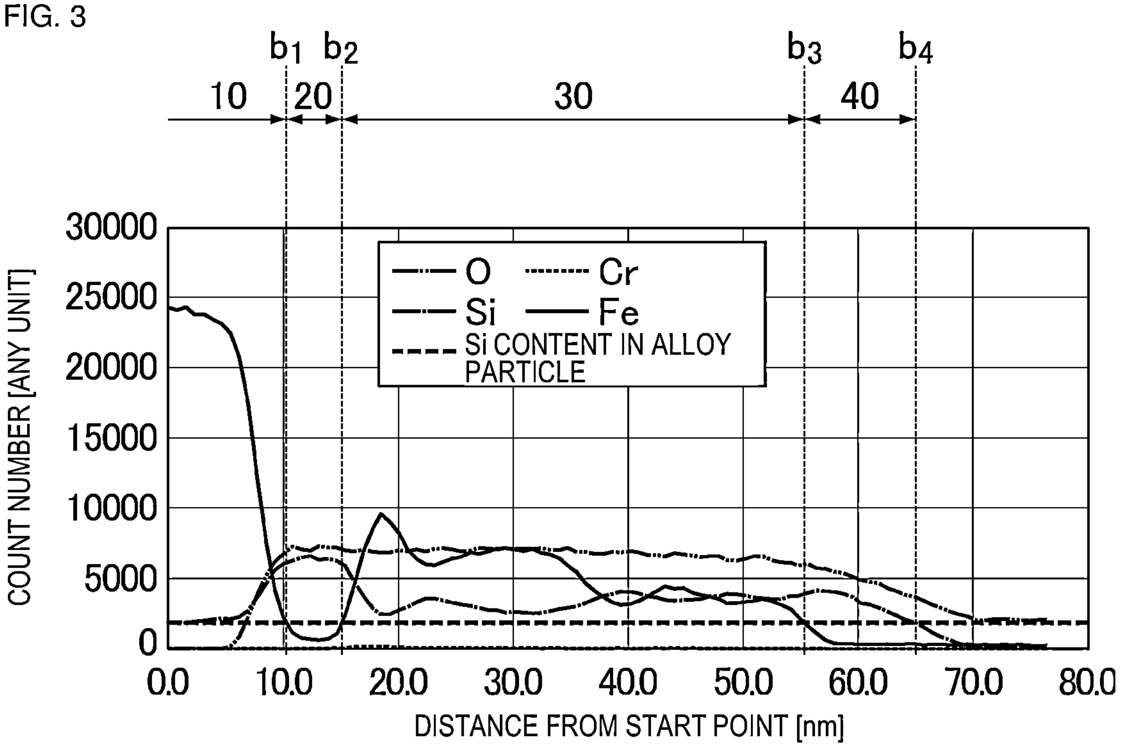
FIG. 3 is a diagram illustrating a result of line analysis in Example 1.

The STEM image of Example 1 is shown in FIG. 2, and the result of the line analysis is illustrated in FIG. 3.

Note that the vertical axis represents a count number [any unit] of the characteristic X-rays (K-lines) of each element, and the horizontal axis represents a distance [nm] from the start point. The horizontal axis was measured at intervals equal to or shorter than 0.9 nm.

From FIG. 2, it was confirmed that the first oxide layer 20, the second oxide layer 30, and the third oxide layer 40 were disposed in this order on the surface of the alloy particle 10.

Note that it was also confirmed from the STEM image that the alloy particles were joined to each other with the first oxide layer, the second oxide layer, or the third oxide layer interposed therebetween.

From FIG. 3, it was confirmed that the oxide layer had the first oxide layer 20 that was a layer in which the Fe content was smaller than the Si content in the alloy particle, the second oxide layer 30 that was a layer in which the Fe content was larger than the Si content in the alloy particle, and the third oxide layer 40 that was a layer in which the Fe content was smaller than the Si content in the alloy particle. Further, it was confirmed that the alloy particle and the oxide layer contained almost no Cr.

Note that the thickness of the first oxide layer of Example 1 was 4.9 nm, the thickness of the second oxide layer was 40.2 nm, and the thickness of the third oxide layer was 9.8 nm.

Further, in the line analysis of element content using the STEM-EDX of Example 1, the ratio of the Fe content to the Si content (Fe content/Si content) at the point where the Si content of the first oxide layer took the local maximum value was 0.10, the ratio of the Fe content to the Si content (Fe content/Si content) at the point where the Fe content of the second oxide layer took the local maximum value was 3.9, and the ratio of the Fe content to the Si content (Fe content/Si content) at the point where the Si content of the third oxide layer took the local maximum value was 0.26.

In FIG. 3, the alloy particle 10 is from the start point to a first boundary $b_1$ which is a point at which the Fe content becomes smaller than the Si content (baseline) in the alloy particle.

The first oxide layer 20 is from the first boundary $b_1$ to a second boundary $b_2$ which is a point at which the Fe content becomes larger than the Si content (baseline) in the alloy particle.

The second oxide layer 30 is from the second boundary $b_2$ to a third boundary $b_3$ which is a point at which the Fe content becomes smaller than the Si content (baseline) in the alloy particle.

The third oxide layer 40 is from the third boundary $b_3$ to a fourth boundary $b_4$ which is a point at which the Si content becomes smaller than the Si content (baseline) in the alloy particle.

Further, it was confirmed from the FFT image obtained by performing Fourier-transformation on the STEM image that the first oxide layer was amorphous, the second oxide layer was crystalline, and the third oxide layer was amorphous.

Measurement of Withstand Voltage Performance

The withstand voltage performance was measured in a thickness direction of the ring. The measurement was performed with a digital ultrahigh-resistance/micro-ammeter (R8340A manufactured by ADVANTEST CORPORATION) in a state where the probe attached thereto pinched the ring, to record a resistance value [Ω] when a predetermined voltage was applied. The applied voltage was swept from 1 V to 10 V in increments of 1 V, and from 10 V to 1000 V in increments of 10 V, until the resistance value was lower than $10^5$[Ω]. The applied voltage [V] immediately before the resistance value was lower than $10^5$[Ω] was recorded, and the electric field intensity [V/mm] was calculated by dividing the thickness of the ring by the recorded voltage. The results are shown in Table 1.

Note that, in a case where the resistance value was not lower than $10^5$[Ω] even at 1000 V that was the maximum applied voltage of the measurement apparatus, the electric field intensity was denoted as equal to or larger than a value obtained by dividing the resistance value [Ω] at 1000 V by the thickness of the ring in the Table 1.

Measurement of Relative Permeability

The ring was impregnated with epoxy-based resin to improve mechanical strength, and then, the relative permeability was measured by using an impedance analyzer (E4991A manufactured by Keysight Technologies, Inc.). The relative permeability employed a value at 1 MHz. The results are shown in Table 1.

Measurement of Direct-Current Superposition Characteristics

Further, a copper wire having a diameter of 0.35 mm was wound 24 times around the ring, and the direct-current superposition characteristics were measured by using an LCR meter (4284A manufactured by Keysight Technologies, Inc.). A direct current of 0 to 30 A was applied to the copper wire to obtain an L value, the relative permeability (μ value) was calculated from the obtained L value, and a current value (Isat@-20%) at which the μ value was decreased to 80% of the initial value was obtained. From Isat@-20%, the ring size, and the number of turns of the copper wire, Hsat@-20% [kA/m] that was a magnetic field in which the μ value was 80% of the initial value was obtained. The results are shown in Table 1.

Note that the ring in which the copper wire is wound is also the inductor according to the present disclosure.

Examples 2 and 3

The ring was produced in a similar procedure to Example 1 except that the pressure for molding the coating film forming particles was changed to each of 300 MPa and 100 MPa, and the electric field intensity, the relative permeability, and the Hsat@-20% were obtained. The results are shown in Table 1.

Comparative Examples 1 to 3

The ring was produced in a similar procedure to each of Examples 1 to 3 except that the raw material particles that were not formed with a coating film were used instead of the coating film forming particles, and the electric field intensity, the relative permeability, and the Hsat@-20% were measured. The results are shown in Table 1.

TABLE 1

| | Manufacturing Conditions | | | Characteristics | | |
|---|---|---|---|---|---|---|
| | Average Thickness of Coating film [nm] | Molding Pressure [MPa] | Heat Treatment Temperature [° C.] | Electric Field Intensity [V/mm] | Relative Permeability | Hsat@-20% [kA/m] |
| Example 1 | 19 | 500 | 690 | Equal to or More Than 790 | 20.5 | 15.0 |
| Example 2 | 19 | 300 | 690 | Equal to or More Than 730 | 15.6 | 20.3 |
| Example 3 | 19 | 100 | 690 | Equal to or More Than 680 | 11.2 | 28.3 |
| Comparative Example 1 | — | 100 | 690 | 273 | 11.8 | 23.4 |
| Comparative Example 2 | — | 300 | 690 | 327 | 17.8 | 13.9 |
| Comparative Example 3 | — | 500 | 690 | 488 | 24.3 | 10.1 |

From the results in Table 1, it can be seen that the metal magnetic particles according to the present disclosure have high electric field intensities and excellent withstand voltage performance as compared with Comparative Examples 1 to 3 in which the coating film forming particles are not formed.

Figure 4:
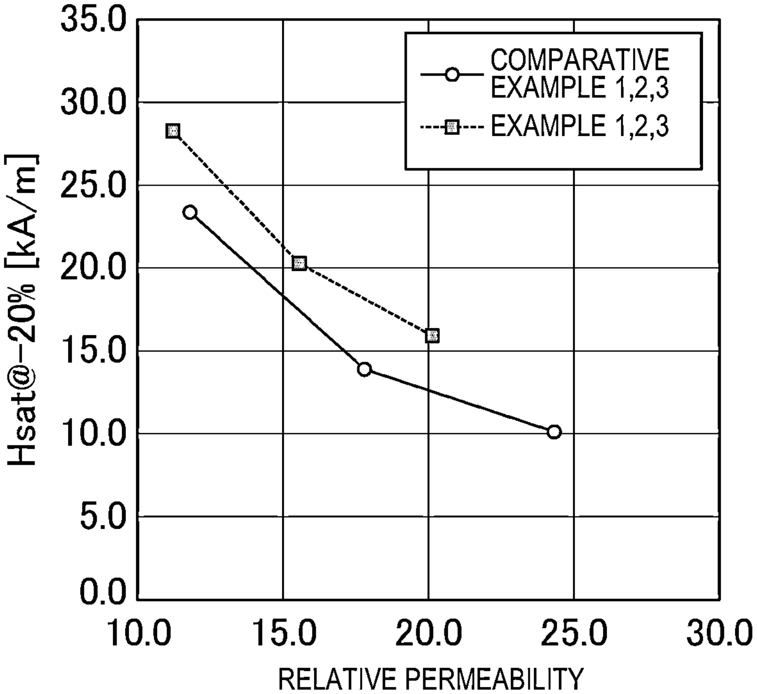
FIG. 4 is a graph illustrating a relationship between Hsat@-20% [kA/m] (the vertical axis) and relative permeability (the horizontal axis) in each of examples and comparative examples.

In addition, FIG. 4 illustrates a relationship between the relative permeability (horizontal axis) and Hsat@-20% [kA/m] (vertical axis) in each of Examples and Comparative Examples. From FIG. 4, it was confirmed that plot positions of the metal magnetic particles according to Examples 1 to 3 shifted to the upper right side, compared to the metal magnetic particles according to Comparative Examples 1 to 3. From this, it can be confirmed that the value of Hsat@-20% tends to be improved when the relative permeability is substantially the same, and it can be found that the metal magnetic particle according to the present disclosure has excellent direct-current superposition characteristics.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A method for manufacturing a metal magnetic core, comprising:

mixing a raw material particle having, on a surface of an alloy particle containing Fe and Si, an Si oxide film and an Fe oxide film from a side of the alloy particle with Si alkoxide and alcohol;

forming a coating film forming particle formed with a coating film containing silicon oxide by hydrolyzing and drying the Si alkoxide;

molding the coating film forming particle; and forming an oxide layer on the surface of the alloy particle by performing heat treatment on the coating film forming particle in an oxidizing atmosphere, wherein an average thickness of the coating film is from larger than 14 nm to 30 nm, a temperature of the heat treatment is from 690° C. to lower than 750° C., and the molding includes printing with and drying paste containing the coating film forming particles.

2. The method for manufacturing the metal magnetic core according to claim 1, wherein the Si alkoxide is tetraethoxysilane.

* * * * *